(12) United States Patent
Schnitzer et al.

(10) Patent No.: US 8,882,147 B2
(45) Date of Patent: Nov. 11, 2014

(54) STEERING COLUMN FOR A MOTOR VEHICLE

(75) Inventors: Rony Schnitzer, Ruggell (LI); Hansjörg Sulser, Gamprin (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 367 days.

(21) Appl. No.: 13/511,482

(22) PCT Filed: Nov. 6, 2010

(86) PCT No.: PCT/EP2010/006771
§ 371 (c)(1),
(2), (4) Date: May 23, 2012

(87) PCT Pub. No.: WO2011/063891
PCT Pub. Date: Jun. 3, 2011

(65) Prior Publication Data
US 2012/0285286 A1    Nov. 15, 2012

(30) Foreign Application Priority Data
Nov. 27, 2009  (DE) .......................... 10 2009 055 973

(51) Int. Cl.
*B62D 1/184* (2006.01)
*B62D 1/19* (2006.01)
(52) U.S. Cl.
CPC ............... *B26D 1/184* (2013.01); *B62D 1/195* (2013.01)
USPC .............................. 280/775; 280/777; 74/493
(58) Field of Classification Search
USPC ...................... 280/775, 777; 74/493
See application file for complete search history.

(56) References Cited

U.S. PATENT DOCUMENTS

| 7,219,926 B2 * | 5/2007 | Ikeda et al. | 280/775 |
| 8,376,403 B2 * | 2/2013 | Warashina et al. | 280/775 |
| 8,746,740 B2 * | 6/2014 | Tanaka | 280/777 |

(Continued)

FOREIGN PATENT DOCUMENTS

| DE | 10 2005 052 123 | 1/2007 |
| EP | 1 468 895 | 10/2004 |
| JP | 2009-154789 | 7/2009 |
| WO | 2008/083811 | 7/2008 |

OTHER PUBLICATIONS

International Search Report issued Feb. 1, 2011 in International (PCT) Application No. PCT/EP2010/006771.

*Primary Examiner* — Drew Brown
(74) *Attorney, Agent, or Firm* — Wenderoth, Lind & Ponack, L.L.P.

(57) ABSTRACT

A steering column includes a steering spindle mounted rotatably about the steering-spindle longitudinal axis thereof, and a bracket unit fixed to the motor vehicle. The casing unit is held on the bracket unit so as to be displaceable in at least one direction parallel to and/or transversely with respect to the steering-spindle longitudinal axis and can be locked in differing positions by a locking mechanism. The locking mechanism has at least one locking element which is mounted moveably, preferably rotatably. In at least one locking position of the locking element, the casing unit is locked in the position thereof in the bracket unit and, in at least one release position of the locking element, the casing unit can be displaced relative to the bracket unit in at least one of the directions parallel to and/or transversely with respect to the steering-spindle longitudinal axis.

24 Claims, 11 Drawing Sheets

(56) References Cited

U.S. PATENT DOCUMENTS

| | | |
|---|---|---|
| 2002/0073798 A1* | 6/2002 | Ryne et al. ............... 74/492 |
| 2005/0104353 A1 | 5/2005 | Ikeda et al. |
| 2005/0173914 A1* | 8/2005 | Sadakata et al. ............ 280/777 |
| 2005/0236825 A1* | 10/2005 | Sawada et al. ............ 280/775 |
| 2006/0151984 A1* | 7/2006 | Higashino et al. ............ 280/775 |
| 2006/0163861 A1* | 7/2006 | Higashino ............ 280/777 |
| 2006/0170204 A1* | 8/2006 | Higashino et al. ............ 280/775 |
| 2006/0207380 A1* | 9/2006 | Higashino ............ 74/493 |
| 2008/0229867 A1 | 9/2008 | Waibel et al. |
| 2010/0018340 A1 | 1/2010 | Schnitzer et al. |
| 2012/0125139 A1* | 5/2012 | Tinnin et al. ............ 74/493 |

\* cited by examiner

STEERING COLUMN FOR A MOTOR VEHICLE

BACKGROUND OF THE INVENTION

The present invention relates to a steering column for a motor vehicle, with a jacket unit in which a steering spindle is supported such that it is rotatable about its steering spindle longitudinal axis, and a bracket unit fixed or fixable on the motor vehicle. The jacket unit is held in or on the bracket unit displaceably in at least one direction parallel and/or transversely to the steering spindle longitudinal axis and securably by a securement mechanism in positions different from one another. The securement mechanism comprises at least one movably, preferably rotatably, bearing-supported securement element, and the jacket unit is secured in at least one locked position of the securement element in its position in or on the bracket unit. In at least one release position of the securement element, the jacket unit is displaceable relative to the bracket unit in at least one of the directions parallel and/or transversely to the steering spindle longitudinal axis.

Generic steering columns are known in a number of physical forms. They are also referred to as adjustable steering columns and permit adjusting the position of the steering wheel in the direction parallel to the steering spindle longitudinal axis and/or carrying out a height adjustment in a direction transversely to the steering spindle longitudinal axis. During driving, the jacket unit is fixed in its position in the bracket unit by means of the securement mechanism. If, by actuating the movably bearing-supported securement element, the securement mechanism is brought into the release position, the jacket unit can be displaced in at least one direction parallel and/or transversely to the steering spindle longitudinal axis relative to the motor vehicle-stationary bracket unit and therewith the position of the steering wheel attached on the steering spindle. When the securement element is subsequently brought again into the locked position, the jacket unit is again held fixedly on the bracket unit. In normal operation, the jacket unit does not move relative to the console unit in the locked position of the securement element. The situation is different in the case in which the motor vehicle collides with another motor vehicle or object. In this case, the steering wheel secured on the steering spindle is not intended to remain rigidly in its position but rather, in the event of an impact of the motor vehicle driver onto the steering wheel, is intended to recede and, for example, be dislocated in the direction toward the engine compartment. In many cases, the kinetic energy of the driver is to be absorbed during this recession. For this purpose, it is known in generic steering columns to lay out the securement mechanism such that it permits a dislocating of the jacket unit relative to the bracket unit even in the locked position of the securement element if, in the event of a collision of the motor vehicle, the motor vehicle driver is thrown onto the steering wheel. In WO 2008/083811 A1 can be found a proposal regarding the manner in which the energy can be absorbed that has been introduced into the steering column through the impact of the motor vehicle driver onto the steering wheel during the dislocating of the jacket unit relative to the bracket unit. The ultimate goal of the energy absorption system disclosed in this publication is dissipating the energy introduced into the steering column during the impact of the motor vehicle driver onto the steering wheel as uniformly as possible and without load peaks, since load peaks or abrupt uncontrolled energy absorptions raise the probability of injuries of the motor vehicle driver.

In the release position of the securement element, a further problematic situation results if the securement mechanism does not secure the jacket unit in position in its relative position to the bracket unit. In this situation, it should be prevented that the jacket unit can be brought into a position relative to the bracket unit in which it can subsequently no longer be secured in the requisite manner or a correct functional use of the steering system by the driver is no longer ensured. In order to delimit the displacement range possible in the release position of the securement element, WO 2008/083811 proposes a break-free element which, upon reaching the maximally permissible displacement range, prevents the jacket unit from becoming further displaced. However, in the event of a correspondingly strong collision the break-free element breaks off and thus enables a further sliding of the jacket unit including the steering spindle such that appropriate energy absorption devices of the steering column can become effective. The disadvantage of this solution is, however, that the breaking away of the break-free element yields a force or load peak which can unnecessarily injure the vehicle driver in the event of a collision. This load peak resulting from the breaking away of the break-free element is generated in the event of a collision in addition to a load peak during the transition from static friction to kinetic friction which results if the jacket unit in the locked position of the securement element, thus with the securement mechanism closed, starts to dislocate relative to the bracket unit.

The present invention addresses the problem of improving a generic steering column to the extent that, on the one hand, the displacement range possible in the release position of the securement element for the jacket unit relative to the bracket unit is limited, on the other hand, unnecessary load peaks are yet as much as possible decreased with respect to prior art.

SUMMARY OF THE INVENTION

The present invention proposes that the steering column comprises a movably bearing-supported and directly or indirectly cooperating stop body which, in the release position of the securement element, is disposed in a first position in which it delimits the displaceability of the jacket unit relative to the bracket unit in at least one of the directions parallel and/or transversely to the steering spindle longitudinal axis, and, in the locked position of the securement element, is disposed in at least one second position in which it is out of engagement with the jacket unit.

Stated differently, according to the invention the break-free element disclosed in WO 2008/083811 is replaced by at least one movably bearing-supported stop body, which directly or indirectly cooperates with the securement element. It is herein provided that the stop body, in the release position of the securement element in which the jacket unit can be set in its position relative to the bracket unit, delimits the displaceability of the jacket unit, thus the possible displacement range. In the locked position of the securement element, thus in the normal operating position in which the motor vehicle is also moved, it is, in contrast, provided that the stop body is brought into a position in which it is not in engagement with the jacket unit, thus is disposed out of engagement with the jacket unit or releases the jacket unit. Thereby is attained that, in the event of a collision in which the securement element is in the locked position, the stop body has no effect on the displacement of the jacket unit relative to the bracket unit. In contrast to the prior art, the stop body thus in the event of a collision does not generate any additional load peaks since it does not hinder the displacement of the jacket unit relative to the bracket unit.

Nevertheless, in the release position of the securement element which, as a rule, is only selected when the motor vehicles are not driven, the stop body ensures a delimitation of the possible displacement range of the jacket unit relative to the bracket unit such that the jacket unit in the release position cannot be brought into positions relative to the bracket unit, which are also not intended in this form by the manufacturer.

The invention also encompasses the case in which the stop body does not cooperate directly with the jacket unit but rather with a structural part moved jointly with the jacket unit into the effective direction for which the delimitation of the movement is to be attained.

It must herein be observed that, in terms of the invention, as the bracket unit can also be understood an intermediate unit which is nondisplaceable in the corresponding displacement direction for which the stops are to be active, however, is displaceable in another displacement direction, for example an adjustment in the direction of height. Thus, if in the text below a bracket unit is discussed, this can always also be applied analogously to the intermediate unit.

Stop bodies according to the invention can delimit the displaceability of the jacket unit relative to the bracket unit in a direction parallel and/or transversely to the steering spindle longitudinal axis. In the case of the direction transversely to the steering spindle longitudinal axis, this direction can be a height adjustment, thus, in the normal operating position of the motor vehicle, in the vertical direction. However, in principle it is also feasible to delimit the adjustability in a different direction transversely to the steering spindle longitudinal axis by means of stop bodies. The term 'transverse' is here not restricted to orthogonal angles, but rather in this context means in particular not parallel and not co-linear. The transverse or height adjustment can also be completed by a corresponding swivelling of the jacket unit relative to the bracket unit.

The securement mechanism of steering columns according to the invention can be realized in different physical forms known within prior art. It is, for example, feasible for the securement mechanism to be implemented such that the jacket unit in the locked position of the securement element is held exclusively under frictional closure in or on the bracket unit. In the steering columns according to the invention, securement mechanisms can also be employed which, in the locked position of the securement element, provide a form-closure or friction- and form-closure securement of the jacket unit in or on the bracket unit. It should further be pointed out that steering columns according to the invention can also comprise different types of energy absorption devices known within prior art, which, in the event of a collision, ensure a specific, potentially additional, energy dissipation.

The securement element can in principle also be motor-driven in order to be able to be brought from the locked position into the release position and back again. However, simpler and more cost-effective variants provide that the securement element can be operated manually or has a handling means that is manually actuatable. This means can be bearing-supported, for example directly or indirectly on the bracket unit, such that it is movable. The securement element can in principle be bearing-supported such that it is shiftable and/or rotatable. Preferred physical forms provide that the securement element is a manually actuatable lever rotatable or swivellable about a securement element axis, wherein the axis, further preferred, coincides with the axis of the clamp bolt of the securement mechanism.

Preferred physical forms provide that the steering column comprises at least one counter-stop body, preferably at least two counter-stop bodies. The stop body in the release position of the securement element for the delimitation of the adjustability of the jacket unit relative to the bracket unit in at least one of the directions parallel and/or transversely to the steering spindle longitudinal axis cooperates with the counter-stop body, preferably with the counter-stop bodies. As a rule, this cooperation only becomes active when the stop body impinges onto the particular counter-stop body. The stop body can be movably supported, for example directly or indirectly in or on the bracket unit. In this case, the counter-stop body or bodies is or are advantageously disposed directly or indirectly in or on the jacket unit. To form fixed abutments, it is advantageously provided that the stop body is fixed in its position, viewed in the direction of displaceability of the jacket unit relative to the bracket unit, in or on the bracket unit and the counter-stop body or bodies is or are fixed in its or their position, viewed in the direction of displaceability of the jacket unit relative to the bracket unit, in or on the jacket unit. It should be clarified that in order to provide the abutment function, the stop body or the counter-stop body or bodies only needs or need to be fixed, viewed in the direction of the displaceability of the jacket unit relative to the bracket unit. In other directions they can definitely be movably bearing-supported, as is the case in the stop body according to the invention, in order to enable it to be brought from the first position into the second position and back again.

Preferred physical forms provide that the counter-stop body or bodies delimits or delimit a channel-like cutout, preferably an elongated hole, delimited by side walls, in the direction, preferably in directions opposite one another, of the displaceability of the jacket unit relative to the bracket unit and the stop body in the release position of the securement element engages into the channel-like cutout. The channel-like cutout, preferably the elongated hole, can herein be disposed, for example, directly or indirectly in or on the jacket unit.

The stop body can be movable back and forth between the first and the second position by using a shifting movement. However, it can equally well be implemented such that it can be brought from the first into the second position and back again by a swivel or rotational movement. Thus, a shiftable bearing of the stop body as well as also a rotatable or swivellable bearing of the stop body is feasible. Superpositions of swivel or rotational and shifting movements of the stop body on its path between a first and a second position can also be realized.

A first type of physical form variants of the invention provides that the stop body is at least regionally implemented as a pin. In particular, in this physical form the stop body can preferably be supported linearly shiftably directly or indirectly in or on the bracket unit. The direction of movement of the shifting movement of the stop body can herein be oriented, for example, orthogonally to the steering spindle longitudinal axis or in a plane normal thereto. In terms of cooperation of securement element and stop body, in the preferred physical forms, the stop body can be guided in at least one, preferably in two opposite movement directions of the stop body with the securement element, preferably in each instance, over at least one control face disposed preferably on an element coupled with the securement element in the movement direction of the securement element with which the securement element is displaceable between the release position and the locked position. Further preferred, the stop body can be disposed directly on the securement element. It is further feasible for the stop body to be guided in at least one, preferably in two opposite, movement direction(s) of the stop body, preferably each over at least one, preferably two, control face(s). The control face(s) is/are disposed on the securement element or on an element coupled with the securement element in the direction of movement of the securement element, with which the securement element is displaceable between the release position and the locked position. The control faces in this sense can also be considered, or referred to, as being guide paths. It is, for example, herein also feasible for the securement element to be supported rotatably about a securement element swivel axis, and for the control face or the control faces to comprise a form encompassing the securement element swivel axis at least regionally in the form of a spiral. In the case of two control faces, these can delimit a preferably channel-like groove into which the stop body engages as into a guide path in positive coupling with the securement element. This groove can be disposed in or on the securement element. In the case of two control faces, it is feasible to move the stop body with a first of the control faces from the first into the second position and with the second of the control faces back again from the second into the first position. In another physical form this positive coupling with two control faces can also be replaced by a single control face. For the resetting into the opposite movement direction of the stop body, in particular in these cases, the stop body can be preloaded against the control face by means of a spring. In particular the stop body can be spring loaded by means of a spring, wherein the spring loading presses the stop body, preferably permanently, against the control face.

This type of implementations using control faces is also applicable when the stop body is linearly displaceably supported. The forms of coupling effect that the movement, preferably swivel movement, of the securement element is by necessity converted into a movement of the stop body suitable for moving the stop body between a first position, in which the movement of the jacket unit is not delimited, and a second position in which the movement of the jacket unit is delimited. The spiral-shaped implementation of the control faces, referred to the securement element swivel axis, can be implemented similarly to a thread turn. In any case the result is that a swivel or rotational movement of the securement element is converted into a shifting movement of the stop body. The pitch of the spiral form does herein not need to be constant but rather can also vary along the spiral-shaped region.

In the case of stop bodies supported swivellably or rotatably, preferred physical forms provide that the securement element is supported rotatably or swivellably about a securement element swivel axis, and the stop body is connected with the securement element preferably such that it is swivellable, preferably via a clamp bolt, preferably about the securement element swivel axis.

In the case of the application of the invention for a height and length adjustable steering column, in which, for example, the height adjustment takes place by a swivelling about a swivel axis, utilizing a swivel lever can be provided on or in which the jacket unit is disposed such that it is displaceable in its length and which lever in turn is disposed such that it can be swivelled together with the jacket unit about a swivel axis with respect to the bracket unit. In such cases, it is advantageous to provide in the swivel lever a bracing for the stop body if the stop body is to delimit the displacement in the direction of the longitudinal spindle axis.

In terms of a method for operating a steering column according to the invention, in the release position of the securement element, the displaceability of the jacket unit relative to the bracket unit can be delimited by the stop body in at least one of the directions parallel and/or transversely to the steering spindle longitudinal axis and in the locked position of the securement element the stop body is disposed out of engagement with the jacket unit.

BRIEF DESCRIPTION OF THE DRAWINGS

Further features and details of preferred embodiments of the invention will be evident in the following description of the figures, in which.

DETAILED DESCRIPTION OF THE INVENTION

Figure 1:
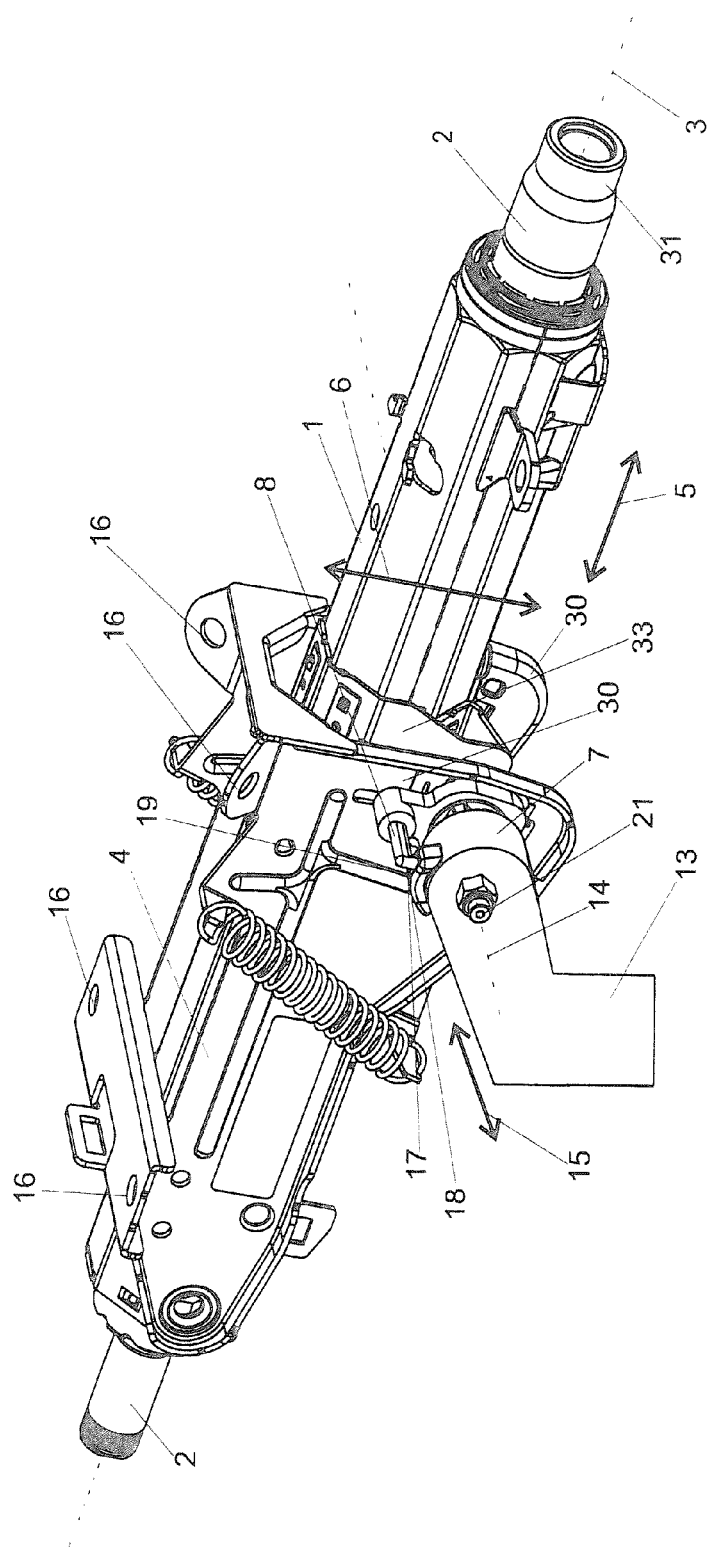
FIGS. 1 to 9 show several depictions with reference to a first embodiment according to the invention.

The invention will be explained in conjunction with examples in which the clamping is effected by a system in which the clamp bolt 21 in the transition from the opened into the locked position is shifted in its longitudinal axis. This shifting is attained in the example through a cam/cam follower system. Such systems are generally known and are therefore not further explained here. Alternatively, a system can also be utilized in which the axial shifting of the clamp bolt 21 is brought about in a different manner, for example through a system with rolling elements that roll out on corresponding races. It is even conceivable and feasible to apply the invention to systems in which the fixing proper of the jacket unit 1 with respect to the bracket unit 4 is effected in a different manner. Decisive is that there is a securement element 7 with which the stop body 8 can cooperate in the manner according to the invention.

In the first example according to the invention, FIG. 1 shows a perspective depiction with line of sight onto the steering column wherein the securement element 7 is in the locked position in which the jacket unit 1 is fixed in its position on the bracket unit 4. This corresponds to that position of the securement element 7 which, in the normal case, is selected for driving the motor vehicle. The securement element 7 consequently, as a rule, is also in the locked position depicted in FIG. 1 if a collision or a crash occurs while the motor vehicle is being driven.

Figure 2:
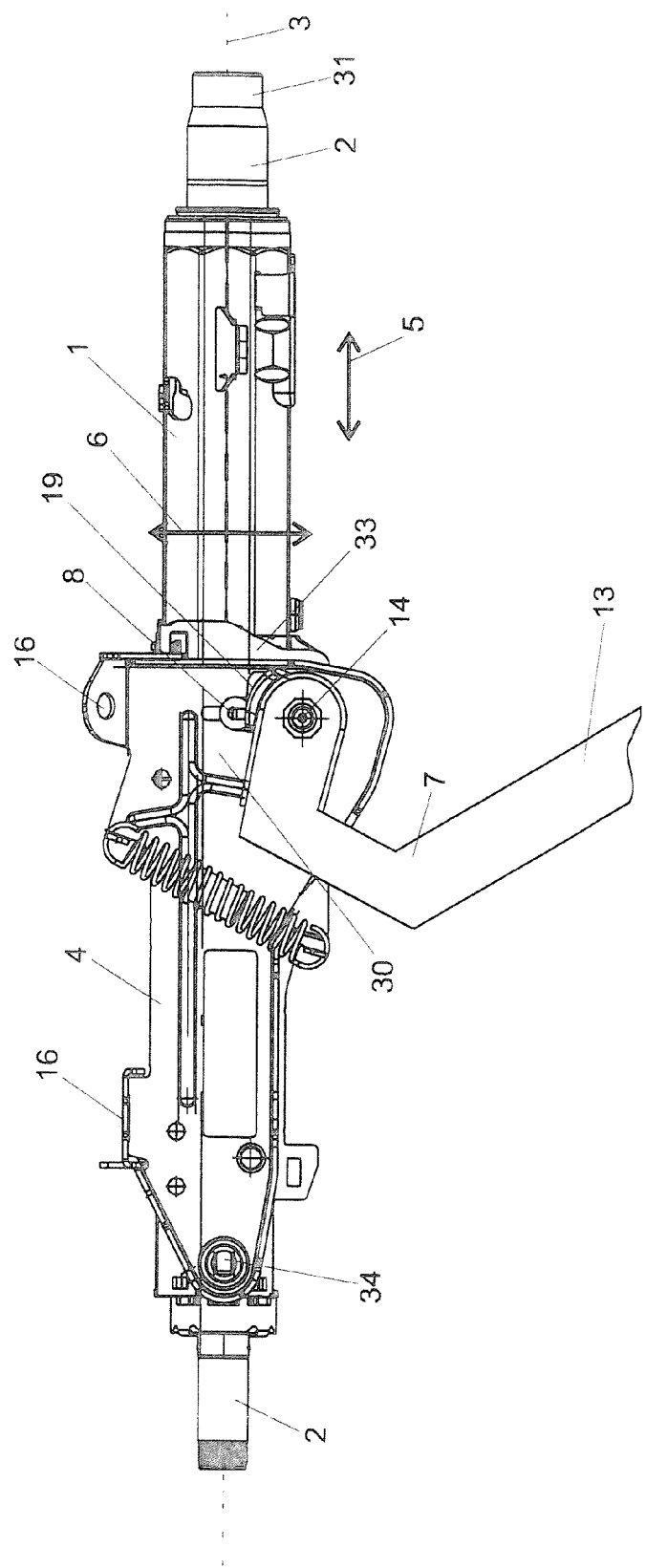
Figure 3:
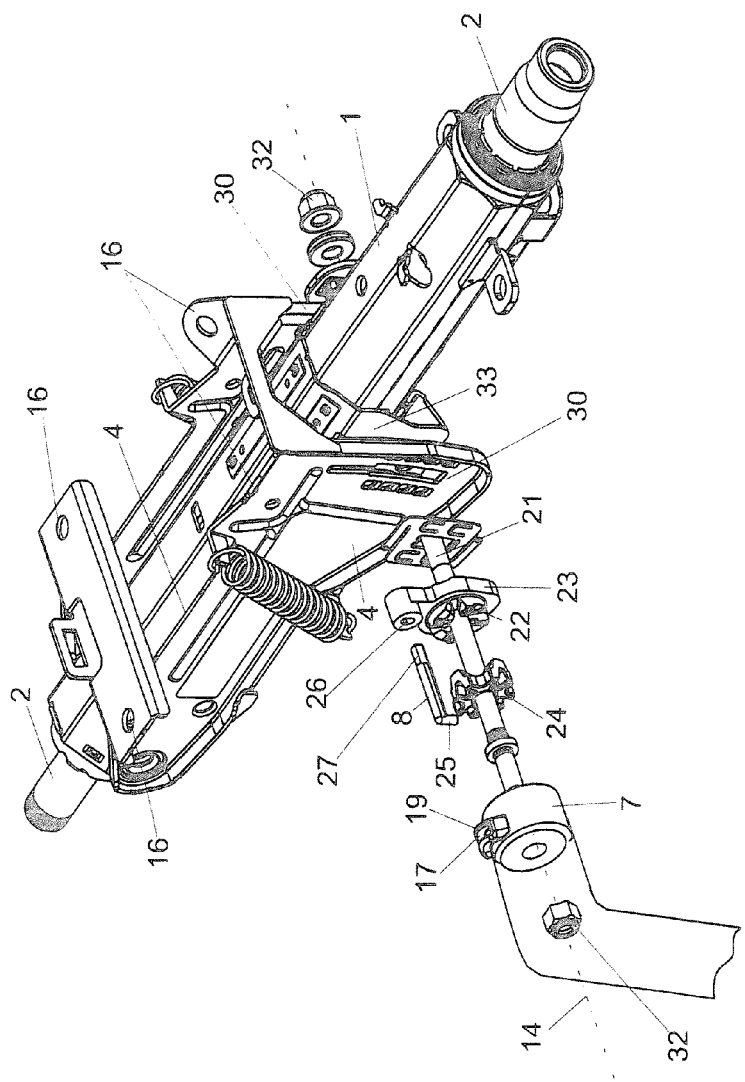
Figure 4:
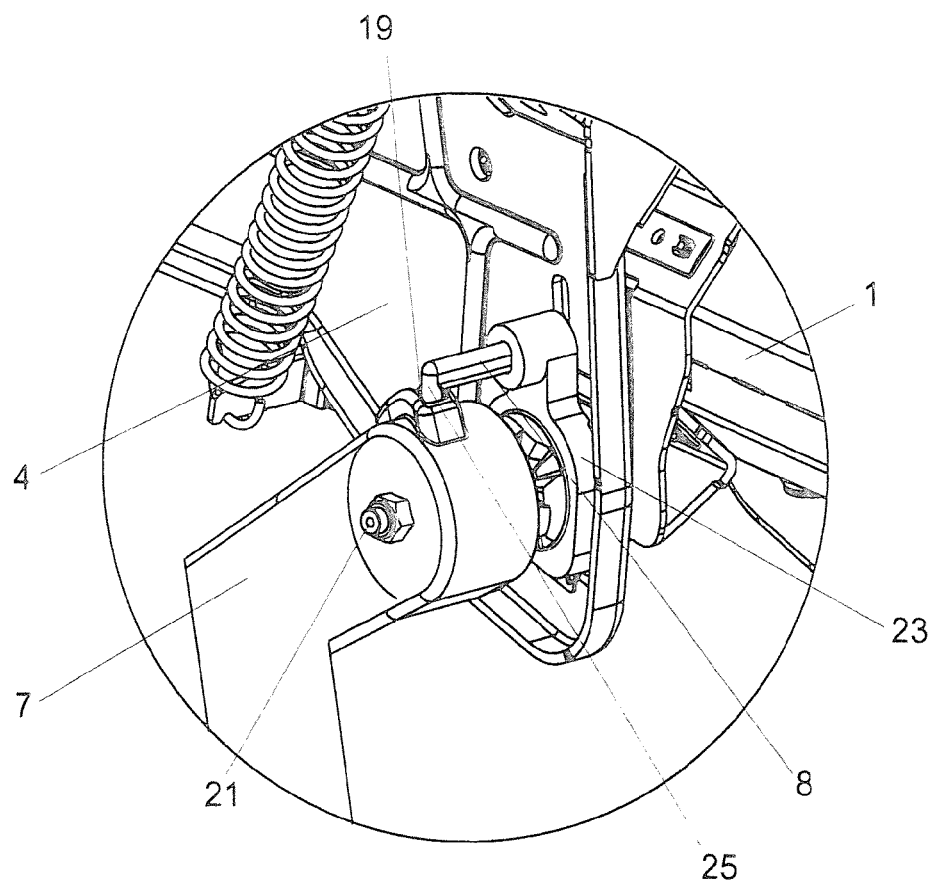
Figure 5:
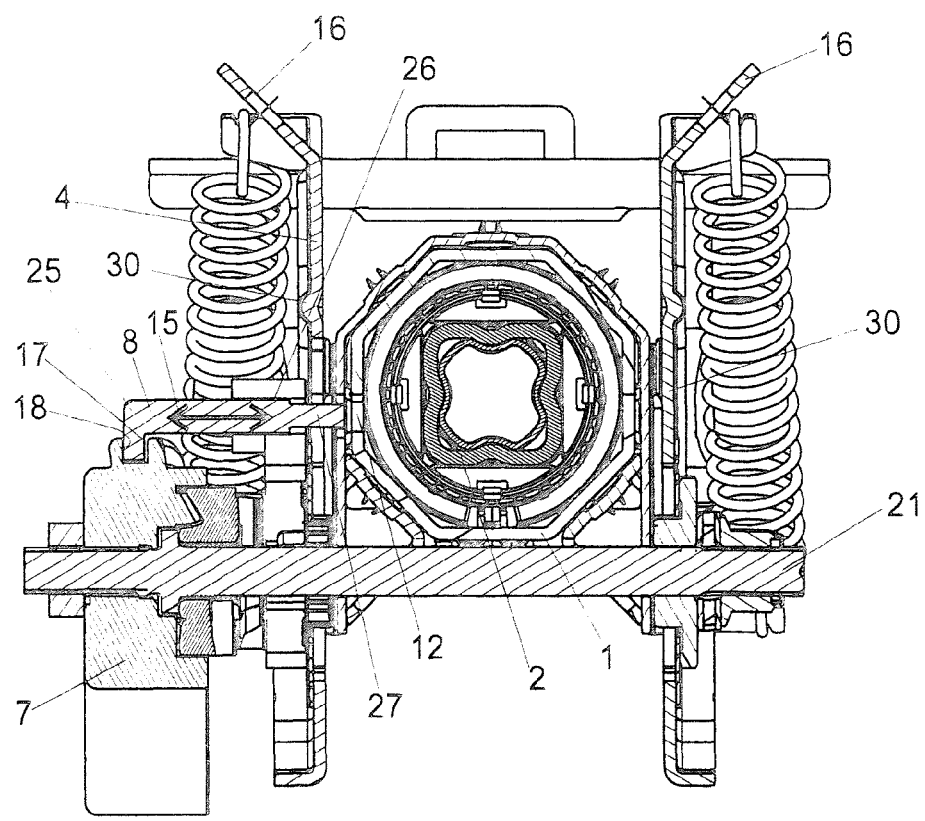
Figure 6:
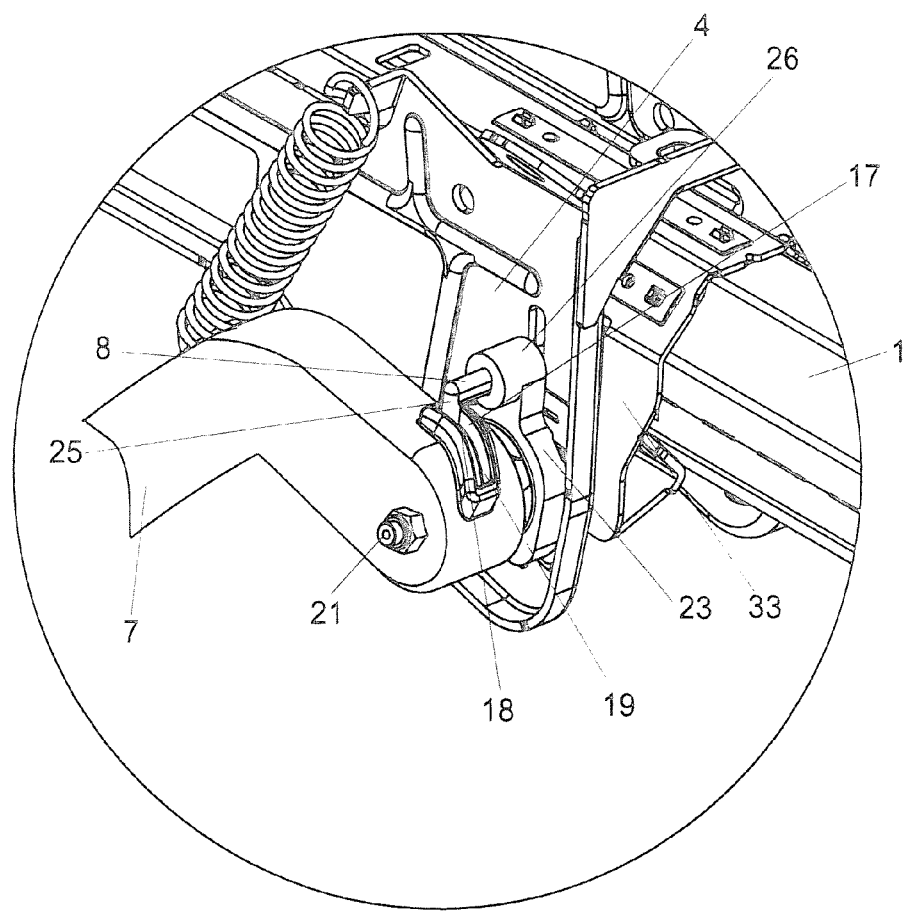
Figure 7:
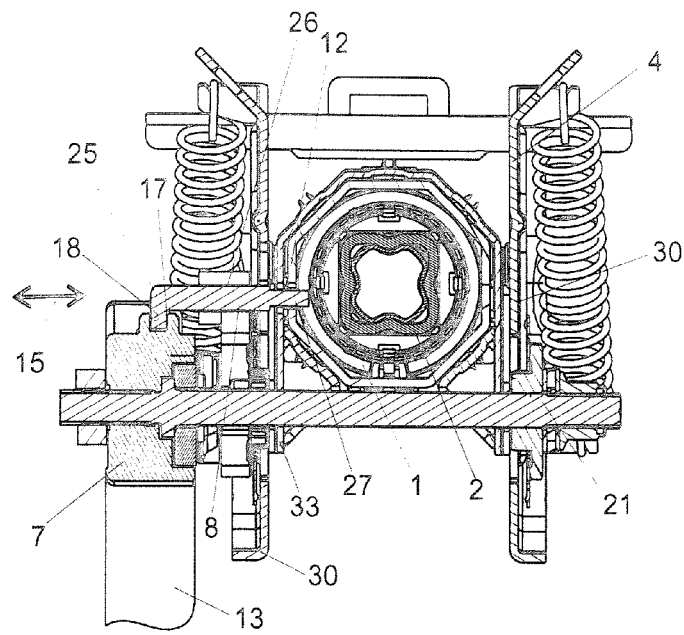
Figure 8:
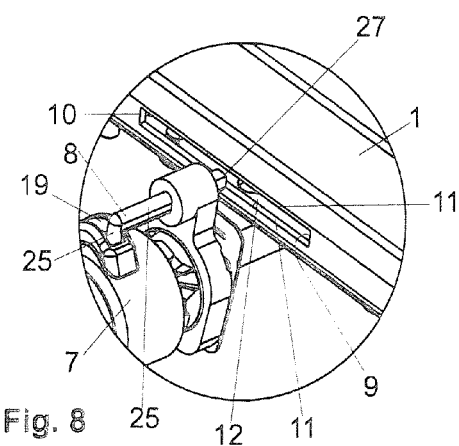
Figure 9:
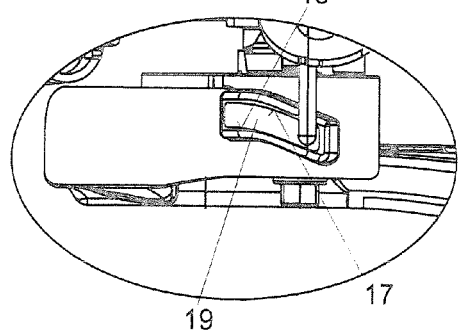

FIG. 2 shows the release position of the securement element 7 in a side view onto the first example of a steering column, in which the jacket unit can be displaced relative to the bracket unit. In the depicted example in this release position of the securement element 7, a displacement of the jacket unit is possible in the direction 5 parallel to the steering spindle longitudinal axis 3 as well as also in the directions 6 transversely to the steering spindle longitudinal axis 3. The displacement feasibility realized here transversely to the steering spindle longitudinal axis 3 is a height adjustment. The height adjustment is enabled through a swivel lever 33 that displaceably guides the jacket unit 1 in the longitudinal direction of the steering spindle longitudinal axis 3 and is supported swivellably or rotatably about the swivel axis 34 in the bracket unit in the height adjustment direction (=inclination adjustment). In this manner, the steering column is implemented to be adjustable in the longitudinal direction 5 and in the height direction 6. FIG. 3 shows the first embodiment example again in a perspective depiction, wherein, however, significant parts of the securement mechanism of this embodiment are shown in an exploded depiction. FIG. 4 shows a detail view of the first example onto the portion essential to the invention, wherein the securement element 7 is in the locked position. FIG. 5 shows a cross section in a plane normal to the steering spindle longitudinal axis 3, which extends through the securement element swivel axis 14. In FIG. 5 the securement element 7 is also in the locked position. FIGS. 6 and 7 each show depictions analogous to FIGS. 4 and 5, wherein, however, the securement element 7 is in the release position in which the jacket unit is displaceable relative to the bracket unit. FIGS. 8 and 9 show still further detail depictions in connection with this first example. FIG. 8 shows a side view of the jacket unit 1 in the proximity of the channel-like cutout 12 which, in the previously discussed Figures, is obscured by the corresponding side jaws 30 of bracket unit 4, wherein further elements of the solution according to the invention are also shown in pulled-apart depiction. As can be seen in FIG. 8, the channel-like cutout 12 in the depicted example is an elongated hole disposed in the jacket unit 1, which alternatively could also be realized as an elongated groove. It is delimited by side walls 11 and the counter-stops 10 and 9. The elongated hole or the channel-like cutout 12 in this embodiment example extends parallel to the steering spindle longitudinal axis 3. However, this does not absolutely need to be the case, other courses are also conceivable and feasible. Moreover, the channel-like cutout 12 also does not need to be an elongated hole. It is equally well possible, for example, to set the side walls 11 and the counter-stops 10 and 9 as walls outside onto the jacket unit 1 in order to form in this manner a channel-like cutout 12. Independently of the particular implementation, this embodiment example provides, as explained below in detail, that the stop body 8 engages into the channel-like cutout 12 and cooperates with the counter-stop bodies 9 and 10 for the delimitation of the displaceability of the jacket unit 1 relative to the bracket unit 4 when the securement element 7 is in the release position. For the sake of completeness reference is made to the fact that counter-stop bodies 9 and 10 do not absolutely need to be part of a channel-like cutout 12. They can equally well be realized as individual bodies or be preferably secured on the jacket unit 1 without side walls 11 being provided which guide the stop body 8 on its path between the counter-stop bodies 9 and 10.

FIG. 9 shows a detail view in connection with the securement element 7. Depicted is a top view onto the groove 19 delimited by the control faces 17 and 18, which, as will be explained in further detail later, cooperate with the stop bodies 8.

Returning to FIG. 1, it should first be noted that in this example the bracket unit 4, fixed by means of the securement tabs 16 on the motor vehicle, comprises two side walls 30 between which the jacket unit 1 and the swivel lever 33 of the steering column is retained. As is known per se, in the jacket unit 1 the steering spindle 2 is bearing-supported such that it is rotatable about the steering spindle longitudinal axis 3. The securement mechanism in this embodiment example is essentially based on frictional closure. In the locked position of the securement element 7 according to FIG. 1 the jaws 30 are pressed by the securement mechanism against the jacket unit 1 such that it is held fast in its position relative to the bracket unit 4 by means of frictional closure. This results in that the steering wheel, not shown here but attached on the rearward, referred to the driving direction of the motor vehicle, end 31 of the steering spindle 2 is fixed in its position. If in this position a crash or a collision occurs and if the motor vehicle driver is thrown onto the steering wheel, not shown here, the steering spindle 2 together with the jacket unit 1 is dislocated relative to the bracket unit 4 such that the rearward end 31 of the steering spindle 2 moves in the direction toward the bracket unit 4. At the beginning of this dislocation of the jacket unit clamped in the bracket unit in the depicted example, first the static friction must be overcome. Hereby, a load peak of not too great a magnitude can be generated. In this type of energy absorption mechanism the energy introduced into the steering column through the loading of the steering wheel is subsequently absorbed through the static friction which must be overcome during the dislocation of the jacket unit 1 relative to the bracket unit 4 when the securement element 7 according to FIG. 1 is in the locked position.

In order not to further load in the described collision event in which the motor vehicle driver is thrown onto the steering wheel with a force or load peak, the stop body 8 is according to the invention in the locked position of the securement element 7 not in engagement with the jacket unit 1, as will be explained later in detail in conjunction with the subsequent Figures. However, first the securement mechanism, especially well visible in the exploded depiction according to FIG. 3, of the depicted example will be briefly explained. This mechanism, in addition to the securement element 7, comprises as is known per se the clamp bolt 21. This bolt in the depicted example is guided below the jacket unit 1 through corresponding cutouts in the side jaws 30 of the bracket unit 4. It is understood that the clamp bolt 21 in other physical forms of the invention can equally well also connect the side jaws 30 above the jacket unit 1. At one end of the clamp bolt 21 is disposed the securement element 7 here implemented as a manually actuatable lever. For the manual actuation, it includes the handle 13. The nuts 32 are, as is known per se, threaded onto the clamp bolt 21. The securement element 7 in the depicted example is swivellable about the securement element swivel axis 14. It can be provided that the securement element is an element swivellable about a securement element swivel axis, preferably a lever actuatable manually, or an electrically driven rotation element. In order to secure the jacket unit 1 in place between the side jaws 30 of the bracket unit 4 by means of frictional closure or clamping, on the clamp bolt 21 is seated a cam unit 24 which, in the mounted state during the swivelling out of place of the securement element 7 on the cam follower contour 22, is turned. In the depicted example, the cam unit 24 is torsion-tight and therewith connected with the securement element 7 rotatably about the securement element swivel axis 14, while the cam follower contour 22 is fixed torsion-tight by means of a contour carrier 23 on the bracket unit 4. As a consequence, during the swiveling out of position of the securement element 7 about the securement element swivel axis 14 the cam unit 24 is turned relative to the cam follower contour 22. Through the outforming or shaping of cam unit 24 and cam follower contour 22 herein, depending on the swivel direction of the securement element 7, tightening or relief of this securement mechanism results. In the locked position of the securement element 7 according to FIG. 1, the side jaws 30 are pressed by the securement mechanism onto one another such that they secure the jacket unit 1 in position between them by means of frictional closure. In the release position depicted in FIG. 2 the side jaws 30 are so far removed from one another or not tightened onto one another such that the jacket unit 1 can be displaced in its position relative to the bracket unit 4.

Apart from the described securement mechanism, the stop body 8 provided according to the invention is also evident in FIG. 3, which in this embodiment example is implemented at least regionally as a shiftable pin. This pin is shiftably supported in the guide channel 26 of the contour carrier 23 and therewith on the bracket unit 4. The stop body 8 includes an end 27 which, as will be described later in detail, delimits in the release position of the securement element 7 the displaceability of the jacket unit 1 relative to the bracket unit 4. At the opposite end of the stop body 8 of this embodiment example is provided an engagement hook 25. Via this hook, the stop body 8 of this example it is positively coupled with the securement element 7. In this example is concretely provided that the stop body 8 permanently engages into the groove 19, delimited by the control faces 17 and 18, on securement element 7. As can be seen especially clearly in FIG. 9, the course of the control faces 17 and 18, referred to the securement element swivel axis 14, is implemented in the form of a spiral in this example. As a consequence, the stop body 8 guided between the control faces 17 and 18 during a swiveling out of position of the securement element 7 about the securement element swivel axis 14 by necessity executes a shifting movement parallel to the securement element swivel axis 14. In the first embodiment example the control face 17 ensures that the stop body 8 during a swiveling out of position of the securement element 7 is pulled from the release position according to FIG. 2 into the locked position according to FIG. 1 in the direction toward the securement element 7. Through this shifting movement of the stop body 8 its end 27, as is evident especially well in a comparison of FIG. 5 with FIG. 7, is pulled out of the channel-like cutout 12 in the jacket unit 1. The end position reached at the end of the shifting movement of the stop body 8 in the locked position of the securement element 7 can be especially well seen in FIG. 5. In this position the stop body 8 is not in engagement with the jacket unit 1 such that this unit according to the invention in the event of a collision can be dislocated relative to the bracket unit 4 without the stop body 8 still exerting an effect on it. Due to this measure, in the event of a collision the energy dissipation is not disrupted through the stop body 8 nor loaded with additional undesirable load peaks. If the jacket unit 1 is to be displaced in one of the directions 5 or 6 relative to the bracket unit 4, for this purpose, first, the securement mechanism must be released. For this purpose the securement element 7 is swiveled about the securement element swivel axis 14 until the release position depicted in FIG. 2 is reached. During this swivel movement out of position of the securement element 7 the control face 18 pushes by necessity the stop body 8 with its end 27 into the channel-like cutout 12 of the jacket unit. In the release position of the securement element 7 herein the position according to FIG. 7 is reached in which the stop body 8 with its end 27 engages into the channel-like cutout 12 of the jacket unit 1. In this position the jacket unit 1 can be displaced against the bracket unit 4 until the stop body 8 or its end 27 impacts on a counter-stop body 9 or 10 depicted in FIG. 8 wherewith the displaceability of the jacket unit 1 relative to the bracket unit 4 is delimited.

The control faces 17, 18 are advantageously implemented such that, during the change from the locked position into the release position, the stop body is shifted such that it is already shifted into the first position, in which it delimits the displacement of the jacket unit, when the holding force level is still greater than 50%, preferably greater than 80%, of the holding force in the locked position between jacket unit 1 and bracket unit 4. Therewith is attained that, even with fast and forceful adjustment actuation of the steering column by the driver, during the opening of the clamping system the jacket unit is not displaced beyond the intended movement range. Due to the geometrically defined interconnections, this layout can be attained simply through geometric definition.

In the first example described up to now, the stop body 8 consequently in both of its possible movement directions 15 is positively coupled with the securement element 7. The control face 17 pulls the stop body out of the channel-like cutout 12. The control face 18 pushes it into the cutout.

This positive coupling in both movement directions 15, however, does not necessarily need to be absolutely provided. This is shown in the second example according to FIGS. 10 and 11. Since this second example is largely implemented analogous to the first example, in the following substantially only the differences between these two examples will be discussed.

Figure 10:
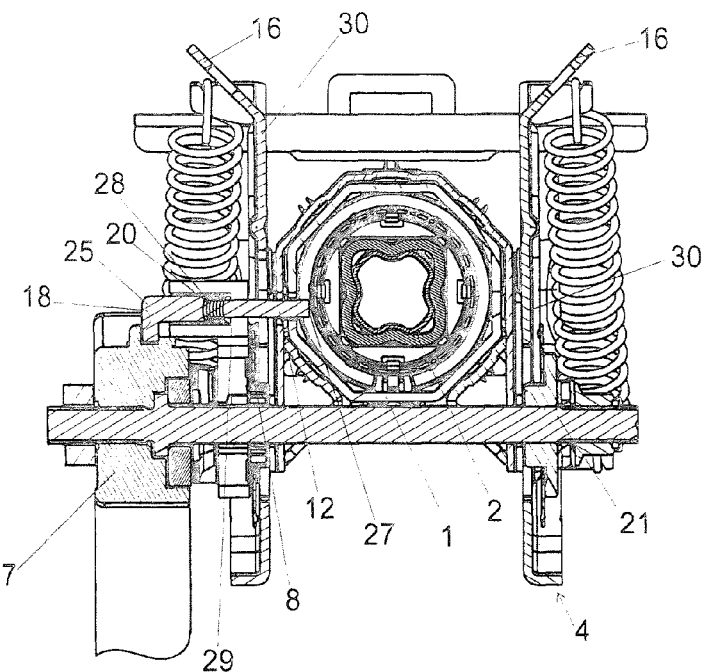
FIGS. 10 and 11 illustrate a second variant according to the invention.
Figure 11:
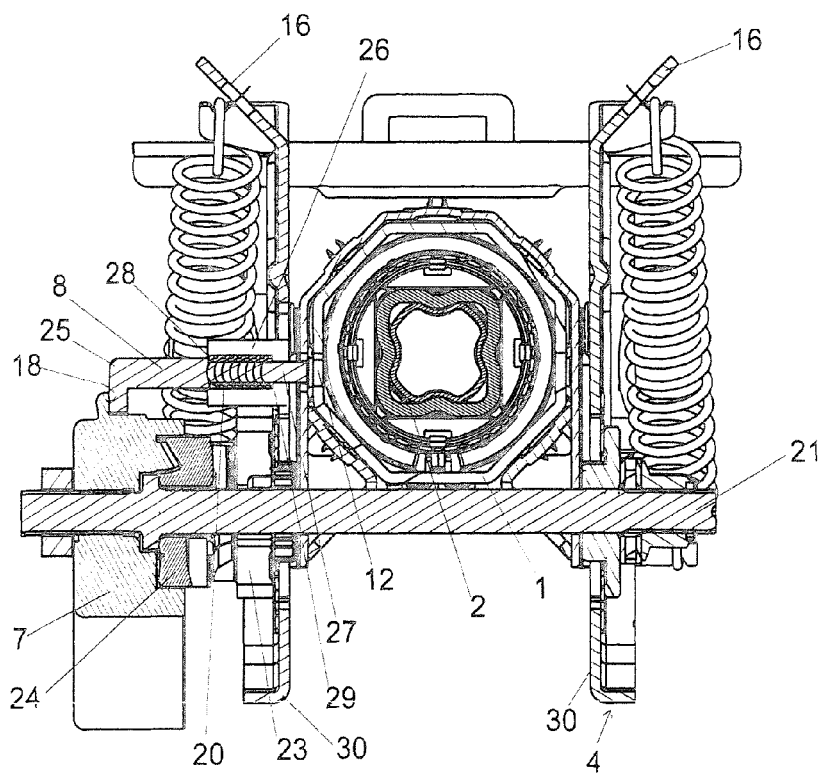

FIG. 10 shows the release position of the securement element 7 of this example, in which the stop body 8 delimits the displaceability of the jacket unit 1 relative to the bracket unit 4 through the engagement into the channel-like cutout 12 in the jacket unit 1. FIG. 11 shows the locked position of the securement element 7, in which the stop body 8 is disposed in its second position in which it is out of engagement with the jacket unit 1. In this second example the shifting of the stop body 8 in the direction toward the jacket unit 1 takes place as in the first example by means of the control face 18. In contrast to the first example, however, in the second example according to FIG. 10 or 11 the control face 17 is not provided. For shifting the stop body 8 out of the channel-like cutout 12 of the jacket unit 1 in the direction toward the securement element 7 a spring element, here in the example the spring 20, is provided in the second example. The spring preloads the stop body 8 in the direction of the control face 18 such that in all displacement positions of the securement element 7 the contact is ensured between the control face 18 and the stop body 8. In the depicted example, the spring 20 is, on the one hand, in contact on the first staying faces 28, which are fixed on the stop body 8. However, on the other hand, the spring 20 is also in contact on the second staying faces 29 which in the depicted example are worked into the guide channel 26. In the release position of the securement element 7 according to FIG. 10 the spring 20 is compressed. As soon as the securement element 7 is swiveled from the position shown in FIG. 10 into the locked position shown in FIG. 11, the spring 20 can push the stop body 8 with its end 27 out of the channel-like cutout 12. Herein the stop body 8 or its engagement hook 25 is pressed in the depicted example permanently against the control face 18 formed, as in the first embodiment example, in the form of a spiral. At the end of this movement the locked position of the securement element 7 according to FIG. 11 is reached in which the stop body 8 no longer engages into the channel-like cutout 12 whereby in the event of a collision a disrupting additional load peak is prevented from being generated through the stop body 8.

Alternatively to the implementation of a special control face 18 with a corresponding spiral-shaped pitch as is illustrated in the Figures, the control face 18 can be realized on the margin surface of the securement element 7 directed toward the jacket unit without separate pitch.

In this case the axial shifting of the stop body 8 would be effected through the cam lift of the locking system with cam and cam follower depicted in the examples.

Figure 12:
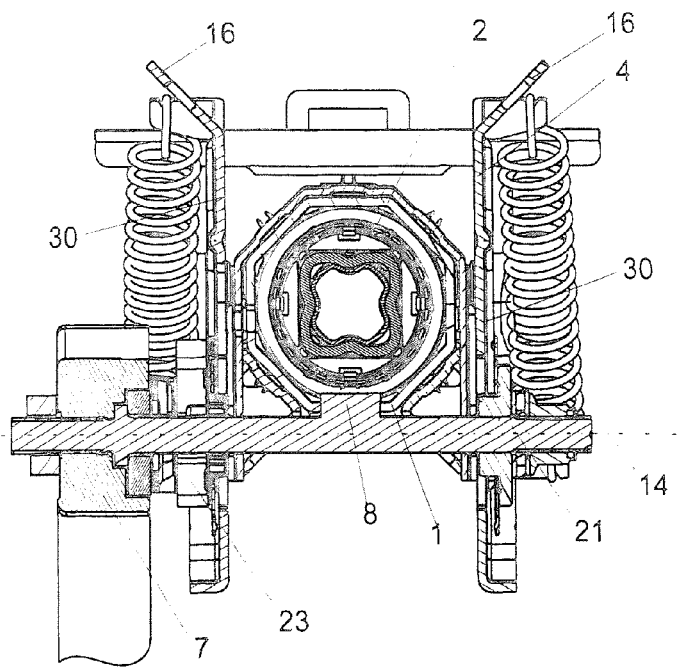
FIGS. 12 and 13 show depictions of a third embodiment according to the invention.
Figure 13:
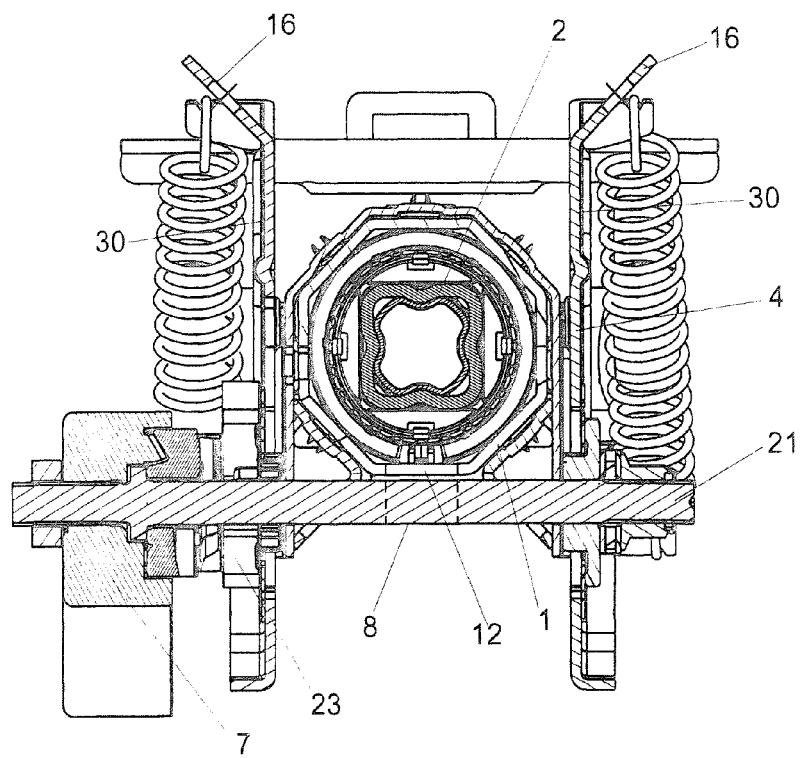

While in the first two examples, the stop body 8 executes a shifting movement in the movement directions 15, in the third example according to FIGS. 12 and 13 is provided that the stop body 8 executes swivel movements when the securement element 7 is moved from its release position into the locked position or conversely. The positive coupling between the stop body 8 and securement element 7 in the depicted example results via the clamp bolt 21. This bolt in this variant is swivellable or rotatable together with the securement element 7 about the securement element swivel axis 14. Through the fixing of the stop body 8 on clamp bolt 21 the stop body 8 by necessity executes jointly this swivel movement about the securement element swivel axis.

In the third example, the channel-like cutout 12 is not disposed laterally but rather on the underside of the jacket unit 1. However, otherwise the channel-like cutout 12 can be implemented as in the other examples. In any event, in this example it also comprises the counter-stop bodies 9 and 10. For the sake of completeness reference is made to the fact that the jacket unit 1 could also be supported so far above the clamp bolt 21 that the counter-stop bodies 9 and 10 do not need to be part of a channel-like cutout or an elongated hole in the jacket unit 1, but rather can also be secured as separate bodies on the jacket unit 1 or be formed thereon.

FIG. 12 shows in any event the release position of the securement element 7 in which the stop body 8 engages into the channel-like cutout 12 in the jacket unit 1. This prevents the jacket unit 1 in the release position of the securement element 7 from being displaced too far against the bracket unit 4 since the abutment of the stop body 8 against one of the counter-stop bodies 9 or 10 occurs before then.

FIG. 13 shows the locked position of the securement element 7. In this position the stop body 8 is not in engagement with the jacket unit 1. It is swiveled out of the channel-like cutout 12 and, in the position depicted in FIG. 13, is completely obscured behind the clamp bolt 21. To illustrate this, the stop body 8 is only depicted in dashed lines on the clamp bolt 21. In this example consequently in the locked position of the securement element 7 it is also ensured that in the event of a collision no additional load peaks during the energy absorption through the displacement of the jacket unit 1 relative to the bracket unit 4 can be generated through the stop body 8.

The several examples illustrate that the invention can be implemented in different implementation forms. These are each only examples of the manner in which the invention is realizable.

Figure 14:
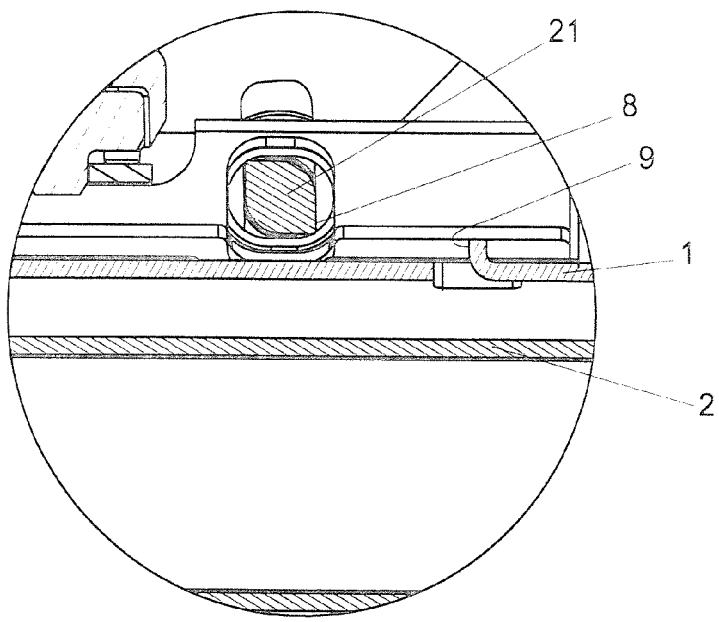
FIGS. 14 and 15 show a depiction of a fourth embodiment according to the invention.
Figure 15:
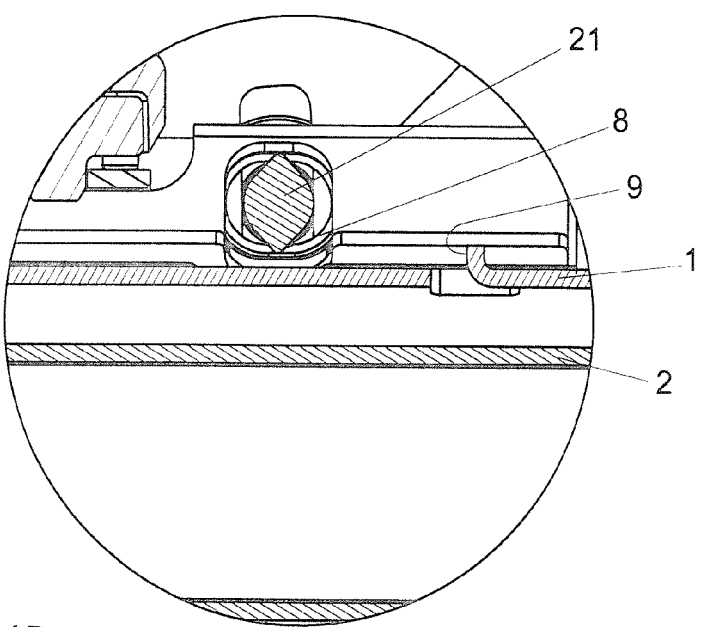

In FIGS. 14 and 15 is illustrated a further alternative implementation of the invention. Here the stop body 8 is realized through an edge on the clamp bolt 21 which intentionally, at least over a portion of its length, is not round but rather non-round. The counter-stop body 9 is formed in simple manner directly on the jacket unit 1 through stamping and bending of a wall section. Care must be taken that the upright wall section forming the counter-stop 9 projects so far from the jacket unit 1 that in the event of an opened locking system the delimitation of the displacement through the cooperation of the stop body 8 with the counter-stop body 9 is enabled, and in the case of the closed locking system, the counter-stop body 9 can be guided past the clamp bolt 21 with adequate clearance. A second counter-stop body 10 (not shown here) can be implemented correspondingly.

Figure 16:
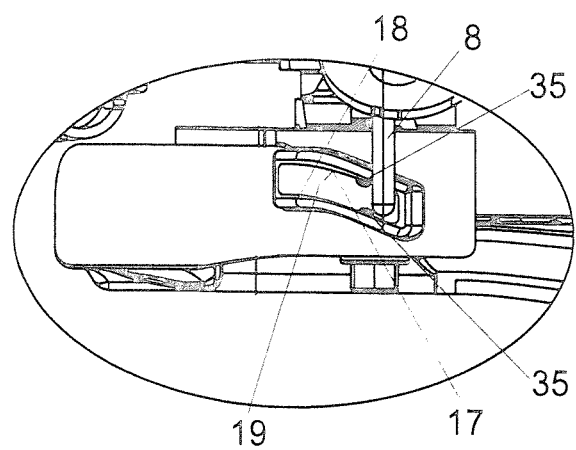
FIG. 16 shows a depiction of a further embodiment of the invention.

In a further development of the invention, it is feasible to improve the crash situation still further by hindering an opening of the clamping system in the event of a crash as could be effected for example through the mass acceleration force of the handle 13. For this purpose, in simple manner into the control faces 17 and 18 are worked dampers 35 which are preferably elastically realized such that the stop body 8 with its engagement hook 25 minimally hinders the rotation of the securement element 7 in the opening direction (cf. FIG. 16). To open the securement mechanism the driver must introduce a minimally increased initial force expenditure into the handle, which imparts him additionally an increased reliability of the securement system.

The handle and the control faces implemented thereon as well as potential dampers are preferably formed of synthetic material such that the entire device can be manufactured as one piece in one injection molding cycle.

LEGEND TO THE REFERENCE NUMBERS

1 Jacket unit
2 Steering spindle
3 Steering spindle longitudinal axis
4 Bracket unit
5 Direction parallel
6 Direction transverse
7 Securement element
8 Stop body
9 Counter-stop body
10 Counter-stop body
11 Side wall
12 Channel-like cutout
13 Handle
14 Securement element swivel axis
15 Movement direction
16 Securement tab
17 Control face
18 Control face
19 Groove
20 Spring
21 Clamp bolt
22 Cam follower contour
23 Contour carrier
24 Cam unit
25 Engagement hook
26 Guide channel
27 End
28 First staying face
29 Second staying face
30 Side jaw
31 Rearward end
32 Nut
33 Swivel lever
34 Swivel axis
35 Damper

The invention claimed is:

1. A steering column for a motor vehicle comprising:
a jacket unit;
a steering spindle bearing-supported in said jacket unit so as to be rotatable about a steering spindle longitudinal axis; and
a bracket unit to be fixed on the motor vehicle;
wherein said jacket unit is held in or on said bracket unit so as to be displaceable in at least one of a parallel direction and a transverse direction with respect to said steering spindle longitudinal axis, said jacket unit being securable in positions differing from one another by a securement mechanism, said securement mechanism including at least one movably supported securement element;
wherein said jacket unit is secured in or on said bracket unit in at least one locked position of said securement element;
wherein, in a release position of said securement element, said jacket unit is displaceable relative to said bracket unit in at least one of the parallel direction and the transverse direction relative to said steering spindle longitudinal axis;
wherein said steering column comprises at least one movably supported stop body cooperating with said securement element directly or indirectly, said stop body being arranged and configured so that:
in the release position of said securement element, said stop body is disposed in a first position for delimiting a displaceability of said jacket unit relative to said bracket unit in at least one of the parallel direction and the transverse direction relative to said steering spindle longitudinal axis; and in a locked position of said securement element, said stop body is disposed in at least one second position in which said stop body is out of engagement with said jacket unit.

2. The steering column of claim 1, wherein each of said at least one securement element of said securement mechanism is rotatably supported.

3. The steering column of claim 1, wherein said steering column comprises at least one counter-stop body; and said stop body is configured and arranged so that, in the release position of said securement element for delimiting the displaceability of said jacket unit relative to said bracket unit in at least one of the parallel direction and the transverse direction relative to said steering spindle longitudinal axis, said stop body cooperates with said counter-stop body.

4. The steering column of claim 3, wherein said steering column comprises at least two counter-stop bodies; and said stop body is configured and arranged so that, in the release position of said securement element for delimiting the displaceability of said jacket unit relative to said bracket unit in at least one of the parallel direction and the transverse direction relative to said steering spindle longitudinal axis, said stop body cooperates with said at least two counter-stop bodies.

5. The steering column of claim 3, wherein said stop body is movably supported directly or indirectly in or on said bracket unit, and said counter-stop body is or are disposed directly or indirectly in or on said jacket unit.

6. The steering column of claim 3, wherein said stop body, viewed in a direction of the displaceability of said jacket unit relative to said bracket unit, is fixed in or on said bracket unit; and wherein said counter-stop body, viewed in the direction of displaceability of said jacket unit relative to said bracket unit, is fixed in or on said jacket unit.

7. The steering column of claim 3, wherein said counter-stop body delimits a channel-like cutout, delimited by side walls in the direction of displaceability of said jacket unit relative to said bracket unit, and said stop body in the release position of said securement element engages into said channel-like cutout.

8. The steering column of claim 7, wherein said channel-like cutout comprises an elongated hole.

9. The steering column of claim 7, wherein said side walls oppose each other and extend in the direction of displaceability of said jacket unit relative to said bracket unit.

10. The steering column of claim 7, wherein said channel-like cutout is disposed directly or indirectly in or on said jacket unit.

11. The steering column of claim 1, wherein said securement element is configured to be swivellable about a securement element swivel axis.

12. The steering column of claim 11, wherein said securement element comprises one of a manually-actuatable lever or an electrically driven rotation element.

13. The steering column of claim 1, wherein said stop body is at least regionally implemented as a pin.

14. The steering column of claim 1, wherein said stop body is supported so as to be shiftable directly or indirectly in or on said bracket unit.

15. The steering column of claim 14, wherein said stop body is supported so as to be linearly shiftable directly or indirectly in or on said bracket unit.

16. The steering column of claim 1, wherein said stop body is guided in at least one movement direction of said stop body over at least one control face, said control face being disposed on one of said securement element or an element coupled with said securement element displaceable in the movement direction of said securement element, with which the securement element is displaceable between the release position and the locked position.

17. The steering column of claim 16, wherein said securement element is supported rotatably about a securement element swivel axis, and said control face has a form encompassing said securement element swivel axis at least regionally in a spiral form.

18. The steering column of claim 16, wherein at least two control faces delimit a groove, and said stop body engages into said groove for positive coupling with said securement element.

19. The steering column of claim 18, wherein said groove is formed in or on said securement element.

20. The steering column of claim 1, wherein said stop body is configured to be spring-loaded by a spring, said spring being configured to press said stop body against said control face when said stop body is spring loaded.

21. The steering column of claim 1, wherein said securement element is supported swivellably about a securement element swivel axis, and said stop body is swivellably connected with said securement element.

22. The steering column of claim 21, wherein said stop body is swivellably connected with said securement element about said securement element swivel axis.

23. The steering column of claim 22, wherein said stop body is swivellably connected with said securement element about said securement element swivel axis via a clamp bolt.

24. A method of operating the steering column of claim 1, comprising:

in the release position of said securement element, delimiting the displaceability of said jacket unit relative to said bracket unit in at least one of the parallel direction and the transverse direction relative to said steering spindle longitudinal axis by said stop body; and disengaging the stop body from said jacket unit in the locked position of the securement element.

* * * * *